United States Patent [19]

Hartweg

[11] Patent Number: 5,707,509
[45] Date of Patent: Jan. 13, 1998

[54] METHOD AND A CATALYZER UNIT FOR REDUCING POLLUTANTS SUCH AS OXIDES OF NITROGEN IN EXHAUST GASES OF INTERNAL COMBUSTION ENGINES

[75] Inventor: Martin Hartweg, Erbach, Germany

[73] Assignee: Daimler-Benz AG, Stuttgart, Germany

[21] Appl. No.: 579,596

[22] Filed: Dec. 26, 1995

[30] Foreign Application Priority Data

Dec. 23, 1994 [DE] Germany .................. 44 46 280.8

[51] Int. Cl.[6] ..................... C25B 9/00; C25F 7/00
[52] U.S. Cl. .................... 205/763; 205/765; 204/275; 204/277; 204/278; 204/421; 204/424
[58] Field of Search ................. 205/763, 765; 204/275, 277, 278, 421, 724

[56] References Cited

U.S. PATENT DOCUMENTS

| | | | |
|---|---|---|---|
| 3,950,944 | 4/1976 | Shidahara et al. | 60/301 |
| 4,253,925 | 3/1981 | Mason | 204/129 |
| 5,022,975 | 6/1991 | Gordon | 205/763 |

FOREIGN PATENT DOCUMENTS

| | | |
|---|---|---|
| 0 566 071 | 10/1993 | European Pat. Off. |
| 36 44 090 | 7/1988 | Germany . |
| WO 92/19361 | 11/1992 | WIPO . |

*Primary Examiner*—Arun S. Phasge
*Attorney, Agent, or Firm*—Evenson, McKeown, Edwards & Lenahan, P.L.L.C.

[57] ABSTRACT

A method for catalytically reducing pollutants, in particular oxides of nitrogen in oxygen-containing exhaust gases of internal combustion engines, uses a catalyzer unit arranged in the exhaust gas flow of the engine. The catalyzer unit has a catalytic layer, an ion conducting layer and a counterelectrode. The catalytic layer exhibits a non-Faraday modification of the catalytic activity.

20 Claims, 2 Drawing Sheets

METHOD AND A CATALYZER UNIT FOR REDUCING POLLUTANTS SUCH AS OXIDES OF NITROGEN IN EXHAUST GASES OF INTERNAL COMBUSTION ENGINES

BACKGROUND AND SUMMARY OF THE INVENTION

The invention relates to a method and a catalyzer unit for reducing pollutants, in particular for reducing oxides of nitrogen in exhaust gases of internal combustion engines. The catalyzer unit is arranged in the exhaust gas flow of the engine. Both the engine and catalyzer unit are employed in automotive technology and are well-known to those of ordinary skill in the art.

In automotive technology, it is usual to employ catalyzers, which have different designs and chemical compositions, for reducing pollutants. In particular, the catalyzers are employed for reducing carbon monoxide, sulphur and oxides of nitrogen, etc. All the catalyzers, however, have the disadvantage that their catalytic effect, and therefore their reaction rate, depends on a plurality of parameters and, in particular, on the temperature of, and the load on, the engine. Particularly in the case of the catalytic reduction of oxides of nitrogen in car exhaust gases, for example, the transient temperature, spatial velocity and composition relationships of the exhaust gases are a characteristic problem. In automobile construction, and particularly in the case of diesel-operated and/or weak-mixture engines, catalyzer materials have therefore been employed in the past which have the largest possible temperature window. In order to achieve a worthwhile reduction rate at low temperatures, the catalyzer must have a drastic reduction in its activation energy at low temperatures. This reduction of the activation energy, however, at the same time usually means that the activity at high temperatures becomes so large that, particularly in exhaust gases containing oxygen, a nonselective combustion of the reduction agent takes place. This in turn, causes the reduction of the oxides of nitrogen to decrease to a substantial extent.

From chemical engineering, catalyzer units are known which exhibit a non-Faraday electrochemical modification of the catalytic activity. This means that their reaction rate can be influenced by a voltage applied to them. These catalyzer units are not, however, suitable for use in the automobile industry because they are unstable in the presence of oxygen-containing exhaust gases such as those from an engine.

There is therefore needed a method and a catalyzer unit in which the reduction of pollutants exhibits good results over the widest possible engine operating range.

These needs are met according to the present invention by a method for catalytically reducing pollutants, in particular oxides of nitrogen in oxygen-containing exhaust gases of internal combustion engines, with the aid of a catalyzer unit arranged in the exhaust gas flow of the engine. The catalyzer unit has a catalytic layer, an ion conducting layer which is chemically stable in the exhaust gas, and a counterelectrode. The catalyzer exhibits a non-Faraday electrochemical modification of the catalytic activity. The activity of the catalyzer unit is controlled using a voltage which is applied to it as a function of the composition and/or the temperature of the exhaust gas. A catalyzer unit for carrying out the method has a catalytic layer and an ion conducting layer which is connected to the catalytic layer so that it is capable of conducting ions and is chemically stable relative to the exhaust gas. The catalyzer unit also has a counterelectrode which is connected to the ion conducting layer so as to be electrically conducting. The catalytic layer has an electrically conducting connection to one pole of a controllable voltage source. The counterelectrode has an electrically conducting connection to the other pole of the controllable voltage source. The catalytic layer is isolated from the counterelectrode with respect to electrical conduction through the ion conducting layer. The reaction rate of hydrocarbons on the catalytic layer with the oxides of nitrogen is high at high voltages and is lower at lower and/or reversed polarity voltages.

The use of a catalyzer unit with a catalytic layer which exhibits- a non-Faraday electrochemical modification of the catalytic activity makes it possible to adapt the activity of the catalyzer unit, which consists of a catalytic layer, an ion conducting layer and a counterelectrode, to suit the current condition of the exhaust gas. This permits the catalyzer effect of the catalyzer unit to be optimized for each condition of the exhaust gas, in terms of its composition and/or temperature, and therefore for each operating condition of the engine. It is, in particular, possible to increase the reduction rate in the lower and medium temperature range and also to reduce the activity in the upper temperature range.

Furthermore, the undesirable formation of nitrous oxide—which presents a problem, particularly in the case of conventional catalyzers in noble metals can be substantially suppressed using the catalytic layer or the type of ion transported via the ion conducting layer and precipitating on the catalytic layer.

Such a catalyzer unit advantageously consists of a porous catalytic layer which is a good electrical conductor and is preferably a noble metal, a noble metal alloy and/or another metallic conducting material, an ion conductor which conducts anions and/or cations, and a counterelectrode. The ion conductor has sufficient electrical conductivity at the temperatures present in the exhaust gas and has sufficient chemical stability relative to the chemicals present in the exhaust gas. The counterelectrode, particularly in view of chemical stability, is preferably manufactured from a relatively noble metal. A voltage is applied to and set on this counterelectrode. The voltage required comes from a controllable voltage source which controls the value of the voltage applied to suit the temperature of the exhaust gas and/or to suit the engine load occurring.

In the case of oxygen and/or hydrogen ion conductors, the species required for the ion transport can be taken from the exhaust gas. In the case of other ions, these other ions must be continuously supplied or taken from a reservoir which can, for example, be filled when fuelling a motor vehicle or during its service cycle.

The energy to be used for the operation of the catalyzer unit is minimal because of the non-Faraday the associated low currents, and the mode of operation, low voltage applied. This energy is generally smaller than the electrical energy previously uselessly supplied by the alternator, once the battery has been charged, during the operation of an engine.

Other objects, advantages and novel features of the present invention will become apparent from the following detailed description of the invention when considered in conjunction with the accompanying drawings.

DETAILED DESCRIPTION OF THE DRAWINGS

Figure 1:
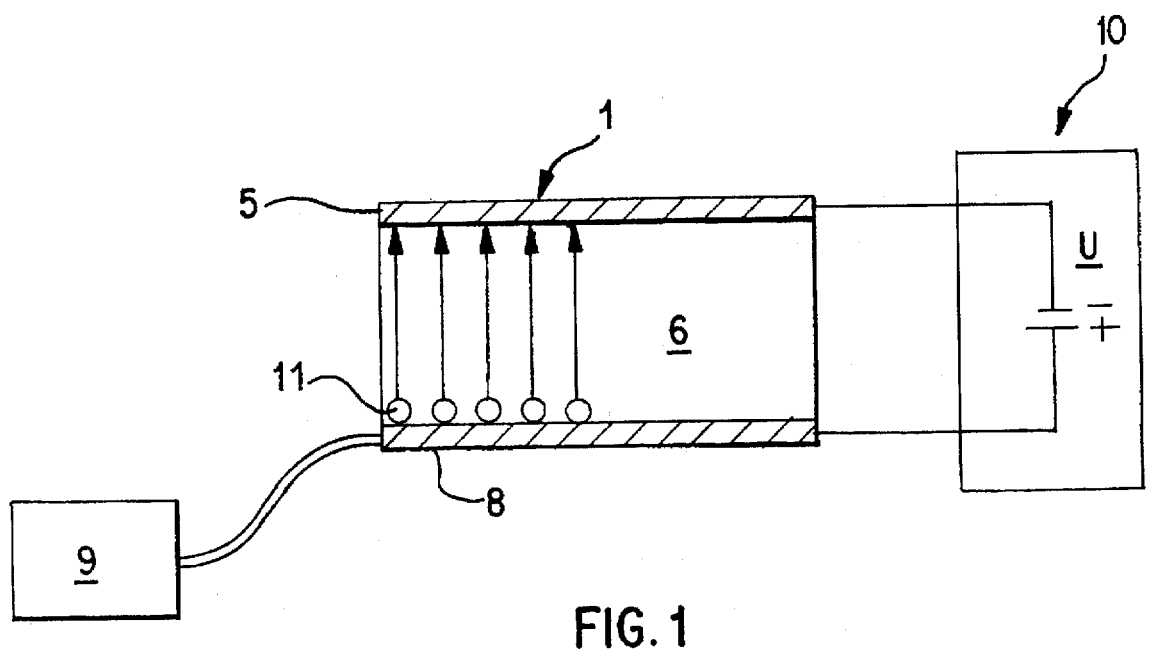
FIG. 1 is a schematic block diagram of the basic structure of a catalyzer unit.

The basic structure of a catalyzer unit 1 with an associated voltage supplied via a controllable voltage source 10 is represented in FIG. 1. The catalyzer unit 1 has a catalytically active layer 5, an ion conducting layer 6, and a metallic layer which acts as a counterelectrode 8 and adjoins the ion conducting layer 6. The catalytic layer 5 is connected to a ground of the controllable voltage source 10. Furthermore, one side of the catalytic layer 5 is covered over its entire surface by the ion conducting layer 6. In this way, the ion conducting layer 6 spatially separates the counterelectrode 8 and the catalytic layer 5 from one another. The ions 11 required for the ion conduction therefore pass from the counterelectrode 8 via the ion conducting layer 6 to the catalytic layer 5, where they are available for reduction purposes.

Figure 2:
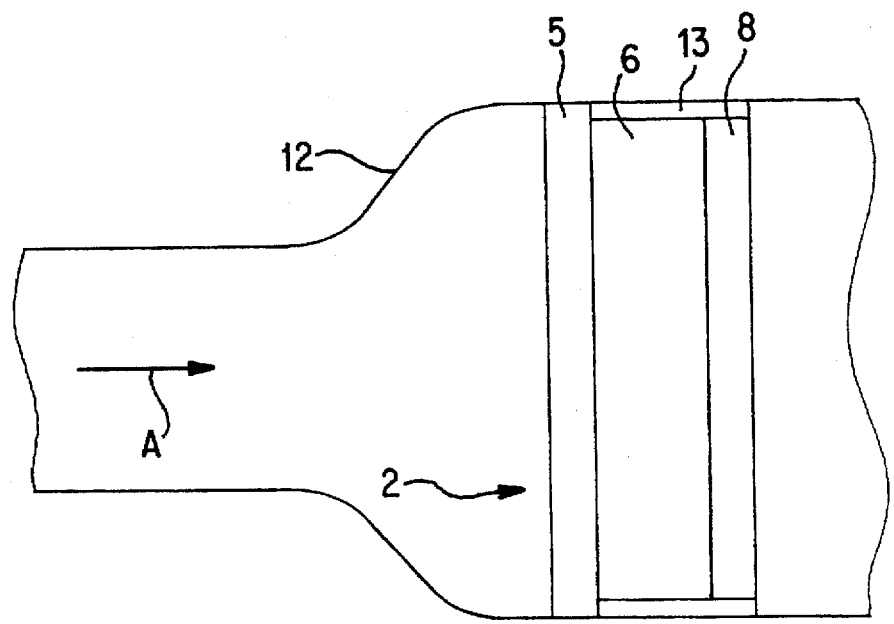
FIG. 2 is a schematic block diagram of an excerpt from an exhaust gas line with a catalyzer unit arranged in the exhaust gas casing and layered in the flow direction of the exhaust gas.

FIG. 2 shows an excerpt from an exhaust gas casing of an exhaust gas line in which is arranged a catalyzer unit 2 whose layer structure is directed in the flow direction (arrow A) of the exhaust gas. Viewed in the flow direction (arrow A), the catalytic layer 5 is at the front and the counterelectrode 8 is therefore at the rear-and forms the last layer. In some cases, however, it is appropriate to exchange these two end layers. All the layers have the common feature that they have a porous or at least gas-permeable configuration so that the flow resistance to the exhaust gas can be kept within tolerable limits. Instead of having a porous configuration, the layers can be configured as a grid or a perforated plate or the like in a manner which is flow-permeable to gases.

It is advantageous to connect the catalytic layer 5 to the sheet metal of the exhaust gas casing 12 in an electrically conducting manner. This connects the catalytic layer in a simple manner to a frame, in particular a grounded frame. In order to avoid a short-circuit and/or parasitic leakage currents, the ion conducting layer 6 and the counterelectrode 8 are surrounded on the outside by an insulating cover of sealing material 13. This is done so that both are electrically insulated relative to the sheet metal of the exhaust gas casing 12. In order for the catalyzer unit 2 to have a good efficiency, i.e. the greatest possible reduction rate, a plurality of such layer sequences are expediently arranged one behind the other in the flow direction (arrow A).

It is useful to connect the ion conducting layer 6 to a reservoir 9. If need be, the reservoir supplies the ions 11 which are necessary for the ion conduction. The reduction agent is advantageously taken from the exhaust gas in the form of combustion residues such as hydrocarbons and/or unburnt fuel and/or fuel constituents and/or fuel decomposition products.

Figure 3:
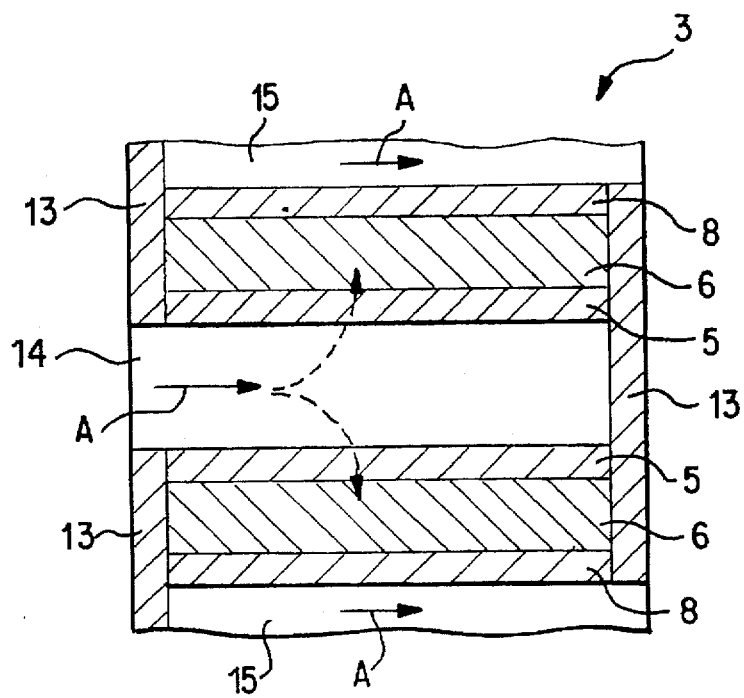
FIG. 3 is a diagram of an excerpt from a catalyzer unit with flow passages directed in the flow direction.

An excerpt from a catalyzer unit 3, which has flow passages 14, 15 directed in the flow direction (arrow A), is shown in FIG. 3. The flow passages 14, 15 are closed so as to provide a seal at one end. In the case of the flow passages, it is necessary to distinguish between an inlet flow passage 14, which is closed so as to seal at the outlet flow end by means, for example, of an end cap, and an outlet flow passage 15, which is closed so as to seal at the inlet flow end by means of a cover cap, for example. Because of the blind-hole type of configuration of the inlet flow passage 14 and the outlet flow passage 15, the exhaust gas can only flow from the inlet flow passage 14 into the outlet flow passage 15 through the walls. For this reason, the layers forming the wall are made porous or at least so that gas can flow through them.

It is useful for a plurality of inlet flow passages to be let into the catalytic layer 5, which preferably has a plate-type configuration, so as to permit the largest possible flow cross-section. The catalytic layer 5 forms an envelope for each of the inlet flow passages 14 opening into this layer at the narrow side.

On each of its flat sides, the catalytic layer 5 is followed by a porous and preferably plate-type ion conducting layer 6 through which gases can flow. On its flat side facing away from the catalytic layer 5, the ion conducting layer 6 is followed by the layer forming the counterelectrode 8, which layer likewise preferably has a plate-type configuration.

The counterelectrode 8 is manufactured from gas permeable material and has outlet flow passages 15 directed in the flow direction (arrow A). The outlet flow passages 15 only open to the narrow side of the counterelectrode 8 located at the rear in the flow direction (arrow A) so that the material of the counterelectrode 8 forms envelopes for the outlet flow passages 15.

The individual layers forming the catalyzer unit 3 are sealed against one another by means of a sealing compound 13 in such a way that the exhaust gas flowing into the inlet flow passages 14 of the catalytic layer 5 can only flow through the ion conducting layer 6 and, subsequently, through the counterelectrode 8 into the outlet flow passages 15. It is recommended that the electrical connections between the catalytic layer 5 and the counterelectrode 8, on the one hand, and the voltage source 10, on the other, be led through the sealing material 13 in an electrically insulated manner.

Figure 4:
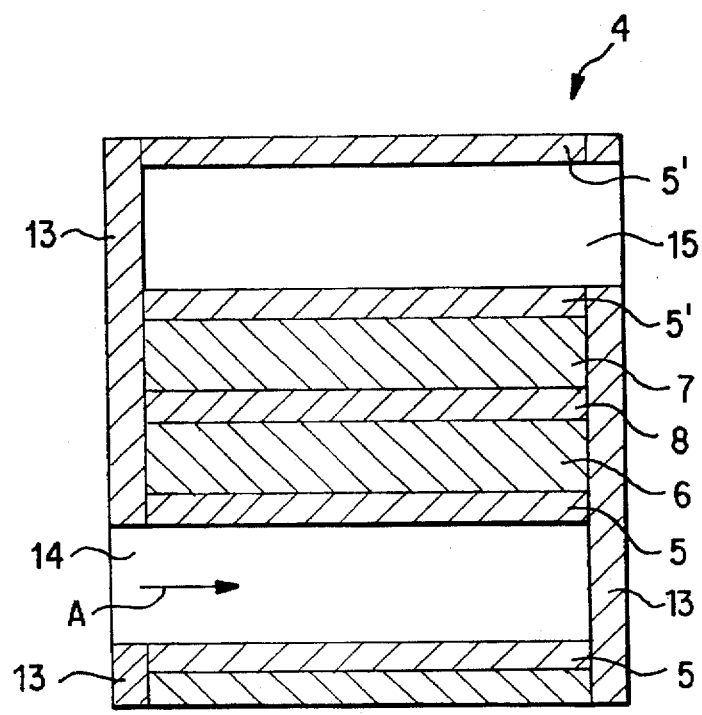
FIG. 4 is a diagram of an excerpt from a catalyzer unit similar to that of FIG. 3, but with a different layer structure.

A better reduction of oxides of nitrogen, in particular, is provided by another embodiment of a catalyzer unit 4 as shown in FIG. 4 which, like the catalyzer unit 3 of FIG. 3, has inlet flow passages 14 and outlet flow passages 15 which are separated from one another and have a blind-hole type of configuration. The inlet flow passages 14 and the outlet flow passages 15, however, are exclusively arranged in the catalytic layers 5, 5' which are spatially separated from one another. Because of this, this catalyzer unit 4 has the following gas-permeable layer structure between the catalytic layer 5 with-the inlet flow passages 14 and the catalytic layer 5' with the outlet flow passages 15: catalytic layer 5 with inlet flow passages 14, first ion conducting layer 6, counterelectrode 8, second ion conducting layer 7, and the catalytic layer 5' with the outlet flow passages 15. The inlet flow passages 14 are again closed in a gas-tight manner by a sealing material 13 at the outlet end and the outlet flow passages 15 are again closed in a gas-tight manner by the sealing material 13 at the inlet end. The layers arranged between the flow passages 14, 15 are provided with sealing material 13 in such a way that they are only gas-permeable transverse to the direction in which the flow passages 14, 15 extend. As a consequence, the exhaust gas flows from the inlet flow passages 14 through the first ion conducting layer 6, and from this layer 6 via the counterelectrode 8 provided for the two catalytic layers 5, 5' and the second ion conducting layer 7, into the outlet flow passages 15 of the following catalytic layer 5'.

Apart from the configurations listed for the structure of a catalyzer unit 1, 2, 3, 4 of the subject matter, other optimized additional designs are obviously possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for catalytically reducing pollutants, the method comprising the steps of:

arranging a catalyzer unit exhibiting a non-Faraday electrochemical modification of a catalytic activity in an exhaust gas flow of an internal combustion engine, said catalyzer unit having a catalytic layer, an ion conducting layer chemically stable in the exhaust gas flow, and a counterelectrode;

controlling the catalytic activity of the catalyzer unit using a voltage applied to the catalyzer unit as a function of at least one of a composition and temperature of the exhaust gas.

2. A method according to claim 1, wherein the controlling step includes the steps of applying the voltage to the catalytic layer and the counterelectrode, said control of the voltage being undertaken via the counterelectrode of the catalyzer unit.

3. A method according to claim 1, further comprising the step of selecting the voltage applied to the catalyzer unit as a function of at least one of an engine rotational speed parameter and engine load condition parameter.

4. A method according to claim 1, further comprising the step of selecting the catalytic activity, using the voltage, so as to be larger in a lower temperature range relative to the catalytic activity at higher temperatures.

5. A method according to claim 1, further comprising the step of applying a larger voltage at low values of at least one of a rotational speed parameter, load parameter, and temperature parameter, at least with respect to a sign of the voltage than is applied at high values of said parameters.

6. A method according to claim 5, wherein at low values of said parameters, the voltage is selected with reversed polarity relative to the voltage at high values of said parameters.

7. A method according to claim 1, further comprising the step of taking ions required for a respective ion transport from the exhaust gas flow when the ion conducting layer conducts at least one of hydrogen ions and oxygen ions.

8. A method according to claim 1, further comprising the step of externally supplying ions from a reservoir for an ion transport.

9. A method according to claim 1, further comprising the step of using as a reduction agent at least one of hydrocarbons, fuel, fuel constituents, and fuel decomposition products of the exhaust gas flow found as combustion residue in the exhaust gas flow.

10. A method according to claim 1, wherein said method reduces oxides of nitrogen in oxygen-containing exhaust gas flows of the internal combustion engine.

11. A catalyzer unit for catalytically reducing pollutants, arranged in an exhaust gas line of an internal combustion engine and having a substance catalytically effective relative to oxides of nitrogen, comprising:

a catalytic layer;

an ion conducting layer connected to said catalytic layer for conducting ions, said ion conducting layer being chemically stable relative to an exhaust gas;

a counterelectrode connected to said ion conducting layer so as to be electrically conducting;

a controllable voltage source;

wherein said catalytic layer has an electrically conducting connection to one pole of said controllable voltage source and said counterelectrode has an electrically conducting connection to another pole of said controllable voltage source;

wherein said catalytic layer is isolated from said counterelectrode with respect to electrical conduction through said ion conducting layer; and wherein a reaction rate of hydrocarbons on said catalytic layer with oxides of nitrogen being high at high voltages and being lower at one of lower and reversed polarity voltages.

12. A catalyzer unit according to claim 11, wherein said catalytic layer is connected to a ground of said voltage source.

13. A catalyzer unit according to claim 12, wherein said ground is a grounded frame.

14. A catalyzer unit according to claim 11, wherein said catalytic layer is arranged over its entire surface approximately equidistant from said counterelectrode, and wherein said ion conducting layer is arranged between said catalytic layer and said counterelectrode so as to maintain said equidistance.

15. A catalyzer unit according to claim 11, wherein said catalytic layer is porous and electrically conducting.

16. A catalyzer unit according to claim 11, wherein said catalytic layer is formed from a metal.

17. A catalyzer unit according to claim 16, wherein said metal is at least one of a noble metal and a noble metal alloy.

18. A catalyzer unit according to claim 11, wherein said controllable voltage source controls the voltage as a function of at least one of an exhaust gas temperature and an engine load.

19. A catalyzer unit according to claim 11, further comprising a supply device for supplying ions required for an ion conduction of said ion conducting layer in the catalyzer unit.

20. A catalyzer unit according to claim 11, further comprising a supply device for ions required for an ion conduction of said ion conducting layer in the catalyzer unit; and a reservoir for storing said ions, said reservoir being connected to said supply device.

\* \* \* \* \*